Patented Dec. 3, 1935

2,022,672

UNITED STATES PATENT OFFICE 2,022,672

COMPOSITION OF MATTER AND ITS USE IN THE PRODUCTION OF FERTILIZERS

Walter H. Kniskern, Prince George County, Va., and Charles K. Lawrence, Syracuse, N. Y., assignors to Atmospheric Nitrogen Corporation, New York, N. Y., a corporation of New York No Drawing. Application May 13, 1932, Serial No. 611,232

27 Claims. (Cl. 71—9)

This invention relates to a urea-ammonium nitrate-ammonia composition, to a process for its preparation, to a method for the transportation of urea and ammonia, and to the production of fertilizers containing urea and ammoniacal and nitrate nitrogen.

The methods for the fixation of atmospheric nitrogen recently developed make available from this source large amounts of ammonia for industrial purposes, particularly for the production of fertilizers. In certain of these fixed nitrogen processes large amounts of carbon dioxide are obtained as a by-product in the preparation of the hydrogen-nitrogen gas mixture required for the synthesis of ammonia. This carbon dioxide may be utilized by combining it with the ammonia to form urea. The production and transportation of ammonia in the form of liquid ammonia and urea as a substantially dry crystalline salt is, however, attended by difficulties and expensive operations due to the high vapor pressure of liquid ammonia at ordinary temperatures and, with respect to the urea, to the cost of evaporating the water formed by the reaction of ammonia and carbon dioxide to recover the urea as a substantially dry solid product.

It is frequently desirable to prepare fertilizers containing both phosphorus and nitrogen, and this may be done by treating mono-calcium acid phosphate materials such as superphosphate or triple superphosphate, with ammonia. It is often desirable, however, to obtain a fertilizer containing a higher proportion of nitrogen than may be obtained by treating a superphosphate material with ammonia alone.

It is accordingly an object of this invention to provide a composition of matter comprising available nitrogen which may be conveniently transported as a liquid of low vapor pressure containing a relatively high percentage of nitrogen. It is further an object of this invention to provide a process for the economical preparation for transportation of urea and ammonia in the form of a liquid composition containing a high proportion of valuable ingredients. Another object of the invention is to provide a process for the production of phosphate fertilizers which may contain a relatively high proportion of nitrogen by treating a mono-calcium acid phosphate material, for example, superphosphate, triple superphosphate or mixtures containing the same with a liquid composition comprising urea, ammonium nitrate and ammonia.

We have discovered that the solubility of urea in ammoniacal liquids may be modified by dissolving ammonium nitrate in the liquid. Thus we have found that whereas a solution of urea in about 50% aqua ammonia saturated at 10° C. contains 1.52 parts of urea for every 1 part of $NH_3$ in the solution, if ammonium nitrate is added to such a saturated urea-ammonia-water solution additional urea may be dissolved in the solution, so that a solution containing 1.35 parts of ammonium nitrate and 2.09 parts of urea for every 1 part of ammonia which does not salt out at 10° C. or above may be prepared.

We have found that the same phenomena hold true for anhydrous liquid ammonia as for aqua ammonia. Thus at 14° C. a saturated solution of urea in the anhydrous liquid ammonia contains about 0.79 parts of urea for every 1 part of ammonia. If to this urea-ammonia solution ammonium nitrate is added, the solubility of the urea is increased so that, for example, a solution of urea and ammonium nitrate in liquid anhydrous ammonia may be prepared containing 1.05 parts of urea and 0.58 parts of ammonium nitrate for every 1 part of ammonia which does not salt out at 14° C. or above.

Not only does the presence of the ammonium nitrate increase the solubility of the urea but we have discovered that the converse relationship holds true; i. e., that by dissolving urea in solutions of ammonium nitrate in liquid anhydrous ammonia or in aqua ammonia, the solubility of the ammonium nitrate in the liquid may be increased. Thus, for example, a solution of ammonium nitrate in about 50% aqua ammonia saturated at —5° C. contains about 3.15 parts of ammonium nitrate for every 1 part of ammonia. By dissolving urea in the ammonium nitrate-ammonia-water liquor the solubility of ammonium nitrate is increased so that, for example, a solution in 50% aqua ammonia of urea and ammonium nitrate which does not salt out at —5° C. may be prepared containing about 1.18 parts of urea and about 4.05 parts of ammonium nitrate for every 1 part of ammonia. This effect of urea upon the solubility of ammonium nitrate is also evident in solutions of these substances in anhydrous liquid ammonia. A solution of ammonium nitrate in anhydrous liquid ammonia saturated at —2° C. contains about 2.78 parts of ammonium nitrate for every 1 part of ammonia whereas a solution of urea and ammonium nitrate in liquid anhydrous ammonia which does not salt out at —2° C. may be prepared containing 1.05 parts of urea and 3.21 parts of ammonium nitrate for every 1 part of ammonia.

It will thus be seen that urea and ammonium nitrate exercise a mutual influence upon the solubility of each other in ammoniacal solutions either in anhydrous liquid ammonia or in aqua ammonia. This is indeed a surprising phenomenon, since ammonium nitrate, and probably urea also, in ammoniacal solution has the ability to form ammoniates by addition of the ammonia to the urea or ammonia nitrate molecule. From this fact it would be expected that upon adding ammonium nitrate to a saturated solution of urea the ammonium nitrate by combining with a part of the ammonia would cause solid urea to precipitate out. The surprising discovery that this is not in fact the case, but that the solubility of the urea is even increased in the presence of the ammonium nitrate is of important practical value since it makes available a composition which retains its fluid state at the ordinary atmospheric temperatures and contains a high proportion of nitrogen-bearing materials; i. e., urea, ammonium nitrate and ammonia. Furthermore, these solutions do not present serious difficulties due to the separation of solid from the liquid under ordinary conditions. Any relatively small amount of solid urea and/or ammonium nitrate which may, under certain circumstances separate out, may be readily redissolved by a slight warming of the solution. These highly concentrated solutions may, therefore, be economically utilized for the transportation of fixed nitrogen. They are of particular value in the preparation of fertilizers by addition, for example, to superphosphate. Since they contain but a relatively small amount of water, they permit the direct production of commercially dry granular fertilizer products by adding the solutions to superphosphate. They permit further, the production of phosphate fertilizers containing a high proportion of plant food. Since they contain a large proportion of total nitrogen for a given amount of alkaline ammonia, the addition of these solutions to a superphosphate in amount such that the alkaline ammonia does not cause excessive reversion of available $P_2O_5$ in the superphosphate imparts to the resulting fertilizer a high nitrogen content. Thus, in treating superphosphate with aqua ammonia, there is a tendency for the ammonia to cause $P_2O_5$ in the superphosphate to be reverted to a citrate insoluble form in which it is considered unavailable as plant food. The addition of urea in treating superphosphate with ammonia further increases the amount of reversion of $P_2O_5$ when the mixture is stored at the temperatures attained in commercial practice. In using the solutions of urea and ammonium nitrate of this invention for treating superphosphate, the ammonium nitrate tends to reduce the combined effects of the ammonia and urea in reverting $P_2O_5$. The use of solutions concentrated with respect to ammonium nitrate and also containing sufficient urea to keep the ammonium nitrate in solution for treating superphosphate, represents an important improvement in precedures for preparing mixed fertilizers as compared with the treatment of superphosphate with an ammoniacal solution of urea containing no ammonium nitrate.

A further advantage in using the solutions of this invention for the production of fertilizers by addition to superphosphate is that the product has a lower hygroscopicity than a product containing a like proportion of nitrogen prepared using an ammoniacal solution of urea not containing ammonium nitrate. Thus, fertilizers can be prepared by using solutions of this invention containing both urea and ammonium nitrate to have a nitrogen content equal to those of fertilizers made with ammoniacal solutions of urea, but the former fertilizers have the advantages of lower hygroscopicity and lower required extent of ammoniation of the superphosphate than the latter. For example, many of these solutions may be used to supply all the nitrogen required in fertilizer mixtures, even in such high analysis mixtures as 12—23—12 ($N—P_2O_5—K_2O$). The fertilizers thus prepared are in excellent physical condition and contain nitrate nitrogen, ammonia nitrogen and urea nitrogen. These advantages follow from the fact that the solutions of this invention contain more urea or ammonium nitrate than can be dissolved in the ammoniacal liquid in the absence of the other.

An important characteristic of the urea-ammonium nitrate-ammonia solutions of this invention, is their lower vapor pressure than that of liquid ammonia or of an aqua ammonia of a corresponding concentration. A solution which does not salt out at temperatures above about −5° C. of urea-ammonium nitrate-ammonia-water having a composition of 16.4% urea, 56.3% ammonium nitrate, 13.9% ammonia and 13.4% water has a vapor pressure ranging from 0.3 atmospheres absolute to 0.8 atmospheres absolute for temperatures between 0° C. and 30° C. Throughout this range of temperatures the vapor pressure of this solution is less than 1 atmosphere whereas for an aqua ammonia of corresponding composition (about 50% aqua) the vapor pressure is from 1 to 3.6 atmospheres. Liquid anhydrous ammonia has a vapor pressure ranging from 4.2 to 11.5 atmospheres absolute for temperatures from 0° C. to 30° C. A solution of urea and ammonium nitrate in liquid anhydrous ammonia which does not salt out at −2° C. and containing 20% urea, 61% ammonium nitrate and 19% ammonia, has a vapor pressure of from 0.5 to 1.9 atmospheres absolute for temperatures ranging from 0° C. to 30° C. The materially lower vapor pressures of the compositions of this invention greatly facilitate their handling during transportation, their storage and their manipulation in the preparation of fertilizers. Solutions of urea and ammonium nitrate in anhydrous liquid ammonia which are substantially saturated with urea at a temperature below 30° C., and particularly at about 0° C., and which contain about 1 part of urea to above about 2 parts of ammonium nitrate, are particularly advantageous from the viewpoint of their relatively low vapor pressures. With water present, however, solutions of a low vapor pressure may be prepared containing a higher ratio of urea to ammonium nitrate.

Urea and ammonia may be prepared for transportation and/or use in the preparation of fertilizers in the form of the liquid compositions of this invention by dissolving solid urea and ammonium nitrate in an ammoniacal liquor such as aqua ammonia or anhydrous liquid ammonia, or ammonia as the liquid or gas or as aqua ammonia may be added to solutions of urea and ammonium nitrate, or to a mixture of solid urea and ammonium nitrate which may contain water, if desired.

The following examples are illustrative of methods of preparing the solutions of this invention. The proportions of materials used in the examples are given in parts by weight.

*Example 1.*—A substantially anhydrous liquid composition may be prepared by mixing 51 parts of substantially dry urea with about 49 parts of liquid anhydrous ammonia. At 14° C., for example, this composition forms a slurry containing about 12.5 parts of solid urea. To this slurry is added about 28 parts of substantially dry solid ammonium nitrate for each 100 parts of slurry. After thorough mixing, the composition will form a homogeneous solution at temperatures about 14° C. or above. The solution thus prepared contains about 57.6% total nitrogen. For each part of nitrogen as free ammonia the solution contains about 0.6 parts of nitrogen in the form of urea and about 0.25 parts of nitrogen in the form of ammonium nitrate.

*Example 2.*—About 50 parts of dry solid urea are mixed with about 50 parts of a 47.5% aqua ammonia. At 10° C., for example, this composition is a slurry containing about 14 parts of undissolved urea. To this slurry may then be added about 32.2 parts of substantially dry solid ammonium nitrate. Upon thorough mixing the undissolved urea and the ammonium nitrate go into solution at a temperature of about 10° C. or above. The solution contains about 41.1% nitrogen. For each 1 part of the nitrogen as free ammonia the solution contains about 1.8 parts of nitrogen as urea and ammonium nitrate taken together.

A composition similar to this may also be prepared by admixing the following ingredients.

(a) 65 parts of a urea-water-composition containing about 50 parts of urea such as may be obtained from a process for the synthesis of urea from ammonia and carbon dioxide.

(b) 43.5 parts of an ammonium nitrate-water composition containing about 32.2 parts of ammonium nitrate and about 11.3 parts of water.

(c) 23.7 parts of anhydrous ammonia which may be added in the form of liquid anhydrous ammonia admixed with the other constituents of the composition or may be added in the form of gaseous ammonia which is absorbed in the mixture of the above urea and ammonium nitrate materials.

*Example 3.*—76.3 parts of dry solid ammonium nitrate are mixed with 23.7 parts of liquid anhydrous ammonia. At −2° C., for example, a slurry would be obtained containing about 10.5 parts of undissolved ammonium nitrate. With this slurry is mixed about 25 parts of solid urea for every 100 parts of the slurry. A clear solution is obtained which does not salt out at temperatures above about −20 C. This composition contains about 1 part of urea and about 3.2 parts of ammonium nitrate for every 1 part of ammonia, and analyzes about 46.2% nitrogen. For each part of nitrogen in the solution in the form of free ammonia there is about 0.6 part of nitrogen as urea and about 1.36 parts of nitrogen as ammonium nitrate.

*Example 4.*—About 67.3 parts of substantially dry solid ammonium nitrate are admixed with about 32.7 parts of a 50% aqua ammonia to form a slurry which at −5° C., for example, would contain about 16 parts of undissolved ammonium nitrate. After thoroughly admixing about 19.6 parts of substantially dry urea with about 100 parts of the slurry a clear solution is obtained which will not salt out at temperatures above about −5° C. The solution thus prepared contains about equal parts of ammonia and water and about 1.2 parts of urea and about 4 parts of ammonium nitrate for every 1 part of ammonia and analyzes about 38.8% nitrogen. For every 1 part of nitrogen in the form of free ammonia in the solution there is about 0.68 part of nitrogen as urea and about 1.75 parts of nitrogen as ammonium nitrate.

The following examples are illustrative of methods for the production of fertilizers in accordance with this invention.

*Example 5.*—About 890 parts of superphosphate are mixed with 160 parts of potassium sulfate (50% K₂O) and 638 parts of sand which serve as an inert filler. The superphosphate may contain for example, about 8% moisture and 18% P₂O₅. The mixture is introduced into a rotating mixer where it is rapidly ammoniated by spraying on to the solid ingredients about 312 parts of a liquid of the following compositions

|  | Parts |
|---|---|
| Urea | 50 |
| Ammonium nitrate | 181 |
| Ammonia | 40.5 |
| H₂O | 40.5 |

The resulting fertilizer mixture is in very good physical condition immediately after ammoniation and also after cooling to room temperature. It contains 6% N., 8% P₂O₅ and 4% K₂O. The nitrogen is present in the following forms:

|  | Percent |
|---|---|
| Ammonia nitrogen | 3.3 |
| Nitrate nitrogen | 1.5 |
| Urea nitrogen | 1.2 |
| Total nitrogen | 6 |

*Example 6.*—To about 2000 parts of superphosphate containing about 18% P₂O₅ and 9% moisture, about 280 parts of a solution containing about 56 parts of urea, 154 parts of ammonium nitrate and 70 parts of ammonia are added by, for example, spraying the solution upon the superphosphate in a rotating mixer. The resulting fertilizer is in excellent physical condition. Moreover, despite the fact that both ammonium nitrate and urea are added to the superphosphate, both of which materials are hygroscopic, the fertilizer product obtained by the process of this example possesses good storage properties. For example, instead of taking up moisture it loses moisture when exposed to an atmosphere of about 60% relative humidity at 30° C.

Both the urea-ammonium nitrate-ammonia solution used in the treatment of superphosphate in this example and the ammoniated product obtained, contain about 0.45 part of nitrogen in the form of urea and about 0.94 part of nitrogen in the form of ammonium nitrate for every 1 part of nitrogen in the form of free ammonia.

*Example 7.*—A concentrated complete fertilizer mixture may be prepared by treating a mixture of about 1000 parts of triple superphosphate (48% P₂O₅) and about 560 parts of potassium sulfate (50% K₂O) with about 720 parts of a solution containing about 118 parts of urea, 406 parts of ammonium nitrate, 100 parts of ammonia and 96 parts of water. The resulting product contains about 12.3% nitrogen, 21.0% P₂O₅ and 12.3% K₂O. Of the total nitrogen both in the solution and in the fertilizer product of this example about 55% is present in the form of ammonia nitrogen, 25% in the form of nitrate nitrogen and 20% in the form of urea.

We have also discovered that sodium nitrate and urea exercise a mutual influence upon the solubility of each other in ammoniacal solutions, either in anhydrous liquid or in aqua ammonia, similar to the effect obtained with urea and ammonium nitrate. Thus we have found that whereas a solution of urea in anhydrous liquid ammonia saturated at −2° C. contains 0.46 part of urea for every one part of ammonia in the solution, if sodium nitrate is added to such a saturated urea-ammonia solution, additional urea may be dissolved so that a solution containing 1.17 parts of sodium nitrate and 1.17 parts of urea for every one part of ammonia which does not salt out at −2° C. or above may be prepared.

Conversely whereas a solution of sodium nitrate in anhydrous liquid ammonia saturated at 6.7° C. contains about 1.30 parts of sodium nitrate for every one part of ammonia, if urea is added to such a saturated sodium nitrate-ammonia solution, a solution containing 1.37 parts of sodium nitrate and 0.97 part of urea for every one part of ammonia which does not salt out at 6.7° C. or above may be prepared.

The same phenomena hold true for solutions of urea and sodium nitrate in aqua ammonia. Thus we have found that whereas solutions of urea and of sodium nitrate in about 50% aqua ammonia saturated at 4.5° C. contain respectively 1.33 parts of urea or 1.21 parts of sodium nitrate, a solution in about 50% aqua ammonia of both urea and sodium nitrate which does not salt out at 4.5° C. or above may be prepared containing about 1.61 parts of urea and 1.61 parts of sodium nitrate for every one part of ammonia.

If desired, additional materials such as ammonium phosphate, ammonium sulfate, potassium chloride, etc., or any two or more of these materials, which in themselves are valuable fertilizers, may be incorporated with the urea-ammonium nitrate-ammonia solutions and the urea-sodium nitrate-ammonia solutions before they are added to the phosphate material or they may be incorporated with the phosphate material before or after the treatment with the urea-ammonia-nitrate liquors.

When in the appended claims reference is made to a solution "saturated with the solid components" at a given temperature, it is intended to refer to a solution which contains an amount of urea and ammonium nitrate which does not salt out a solid phase of one or both of these materials at the given temperature, but which upon cooling to a materially lower temperature deposits solid urea and/or ammonium nitrate, or a solid comprising either urea or ammonium nitrate or both.

Further, it should be understood that since the several ingredients of the urea-ammonia-nitrate solutions of this invention may react with each other to some extent at least, it is intended that the appended claims cover solutions having a composition corresponding to that resulting from admixture of the substances specified in the claims, irrespective of whatever reaction may take place between the ingredients or the manner in which the solution is formed.

We claim:

1. As a new composition of matter, a solution of urea and ammonium nitrate in liquid anhydrous ammonia in the proportions of about 1 part of urea and about 3.2 parts of ammonium nitrate for every 1 part of ammonia.

2. As a new composition of matter a substantially anhydrous liquid comprising urea, ammonium nitrate and ammonia in the proportions of about 1 part of urea to above about 2 parts of ammonium nitrate and substantially saturated with the solid components at a temperature of about 0° C.

3. As a new composition of matter, a liquid comprising urea, ammonium nitrate, ammonia and water in the proportions of about equal parts of ammonia and water and about 1.2 parts of urea and 4 parts of ammonium nitrate for every 1 part of ammonia.

4. A process for the preparation for transportation of urea and ammonia which comprises dissolving both urea and ammonium nitrate in an ammoniacal liquor containing a substantial proportion of ammonia, said urea and ammonium nitrate being added to the liquor in amount sufficient to form a solution substantially saturated with the solid components at a temperature below about 30° C.

5. A process for the preparation for transportation of urea and ammonia which comprises preparing a solution of said urea and ammonium nitrate in liquid anhydrous ammonia in the proportions of about 1 part of urea to above about 2 parts of ammonium nitrate and in amount to form a solution substantially saturated with the solid components at a temperature about 0° C.

6. A process for the preparation for transportation of urea and ammonia which comprises preparing a liquid composition comprising urea, ammonia, water and ammonium nitrate in the proportions of about equal parts of ammonia and water and about 1.2 parts of urea and about 4 parts of ammonium nitrate for every 1 part of ammonia.

7. A process for producing a fertilizer which comprises mixing an acidic fertilizer material with an ammoniacal solution of urea and ammonium nitrate which is added to said material, said solution prior to addition to said acidic fertilizer material containing a substantial proportion of ammonia and being substantially saturated with the solid components at a temperature within the range of ordinary atmospheric temperatures.

8. A process for producing a fertilizer which comprises adding to and mixing with a superphosphate material a substantially anhydrous liquid comprising urea, ammonium nitrate and ammonia in the proportions of about 56 parts of urea to 154 parts of ammonium nitrate and 70 parts of ammonia, said liquid being added to the superphosphate material in the proportions of about 280 parts of liquid to about 2000 parts of superphosphate.

9. A process for producing a fertilizer which comprises adding to and mixing with a superphosphate material a liquid comprising urea, ammonium nitrate and water in the proportions of about 50 parts urea, 181 parts of ammonium nitrate to 40.5 parts of ammonia to 40.5 parts of water, said liquid being added to the superphosphate material in the proportions of about 312 parts of the liquid to about 390 parts of superphosphate.

10. As a new composition of matter, a solution of both urea and ammonium nitrate in an ammoniacal liquor containing a substantial proportion of ammonia, said solution being substantially saturated with the solid components at a temperature below about 30° C.

11. As a new composition of matter, a solution of both urea and ammonium nitrate in an ammoniacal liquor containing a substantial proportion of ammonia, said solution being substantially saturated with the solid components at a temperature within the range of ordinary atmospheric temperatures.

12. As a new composition of matter, a solution of both urea and ammonium nitrate in an ammoniacal liquor containing a substantial proportion of ammonia, said solution being substantially saturated with the solid components at a temperature of about 0° C.

13. As a new composition of matter, a substantially anhydrous solution of urea and ammonium nitrate in ammonia, said solution being substantially saturated with the solid components at a temperature within the range of ordinary atmospheric temperatures.

14. A process for the preparation for transportation of urea and ammonia which comprises dissolving both urea and ammonium nitrate in an ammoniacal liquor containing a substantial proportion of ammonia, said urea and ammonium nitrate being added to the liquor in amount sufficient to form a solution substantially saturated with the solid components at a temperature within the range of ordinary atmospheric temperatures.

15. A process for the preparation for transportation of urea and ammonia which comprises preparing a solution of a urea-water composition obtained as a product of the synthesis of urea from ammonia and carbon dioxide and ammonium nitrate in an ammoniacal liquor containing a substantial proportion of ammonia, said solution being saturated with the solid components at a temperature within the range of ordinary atmospheric temperatures.

16. A process for the preparation for transportation of urea and ammonia which comprises admixing a urea-water composition obtained as a product of the synthesis of urea from ammonia and carbon dioxide, an ammonium nitrate-water composition, and anhydrous liquid ammonia in amounts forming a liquid composition substantially saturated with the solid components at about 0° C.

17. A process for producing a fertilizer which comprises adding to and mixing with a monocalcium acid phosphate material a solution of both urea and ammonium nitrate in an ammoniacal liquor containing a substantial proportion of ammonia, said solution prior to addition to said phosphate material being substantially saturated with the solid components at a temperature below about 30° C.

18. A process for producing a fertilizer which comprises adding to and mixing with a superphosphate material a solution of urea and ammonium nitrate in an ammoniacal liquor containing a substantial proportion of ammonia, said solution prior to addition to said superphosphate material being substantially saturated with the solid components at a temperature within the range of ordinary atmospheric temperatures.

19. A process for producing a fertilizer which comprises adding to and mixing with a superphosphate material a substantially anhydrous liquid comprising urea, ammonium nitrate and ammonia, said liquid prior to addition to said superphosphate material being substantially saturated with the solid components at a temperature within the range of ordinary atmospheric temperatures.

20. As a new composition of matter, a solution of urea and ammonium nitrate in substantially anhydrous ammonia, said solution being substantially saturated with the solid components.

21. A process for the preparation for transportation of urea and ammonia which comprises dissolving urea and ammonium nitrate in anhydrous liquid ammonia in amount sufficient to form a solution substantially saturated with the solid components.

22. As a new composition of matter, a liquid comprising urea, ammonium nitrate and a substantial proportion of ammonia, said liquid containing an amount of at least one of the solid materials dissolved therein in excess of that necessary for saturation of the liquid in the absence of the other of said solid materials.

23. As a new composition of matter, a solution of urea and ammonium nitrate in anhydrous liquid ammonia, said solution containing an amount of at least one of the solid materials dissolved therein in excess of that necessary for saturation of the liquid ammonia in the absence of the other of said solid materials.

24. A process for the preparation for transportation of urea and ammonia which comprises dissolving both urea and ammonium nitrate in an ammoniacal liquor containing a substantial proportion of ammonia, said materials being employed in proportions such that the resulting liquid composition contains an amount of at least one of the solid materials in excess of that necessary for saturation of the ammoniacal liquid in the absence of the other of said solid materials.

25. A process for the preparation for transportation of urea and ammonia which comprises dissolving both urea and ammonium nitrate in anhydrous liquid ammonia in amount sufficient to form a solution containing at least one of the solid materials in excess of the amount necessary for saturation in the liquid ammonia in the absence of the other of said solid materials.

26. A process for producing a fertilizer which comprises treating an acidic fertilizer material with a solution of ammonium nitrate and urea in an ammoniacal liquid containing a substantial proportion of ammonia, said solution containing an amount of at least one of the said ammonium nitrate and urea dissolved therein in excess of that necessary for saturation of the ammoniacal liquid in the absence of the other of said solid materials.

27. A process for producing a fertilizer which comprises treating a superphosphate material with a solution of ammonium nitrate and urea in an ammoniacal liquid containing a substantial proportion of ammonia, said solution containing an amount of at least one of the said ammonium nitrate and urea dissolved therein in excess of that necessary for saturation of the ammoniacal liquid in the absence of the other of said solid materials.

WALTER H. KNISKERN.
CHARLES K. LAWRENCE.